UNITED STATES PATENT OFFICE.

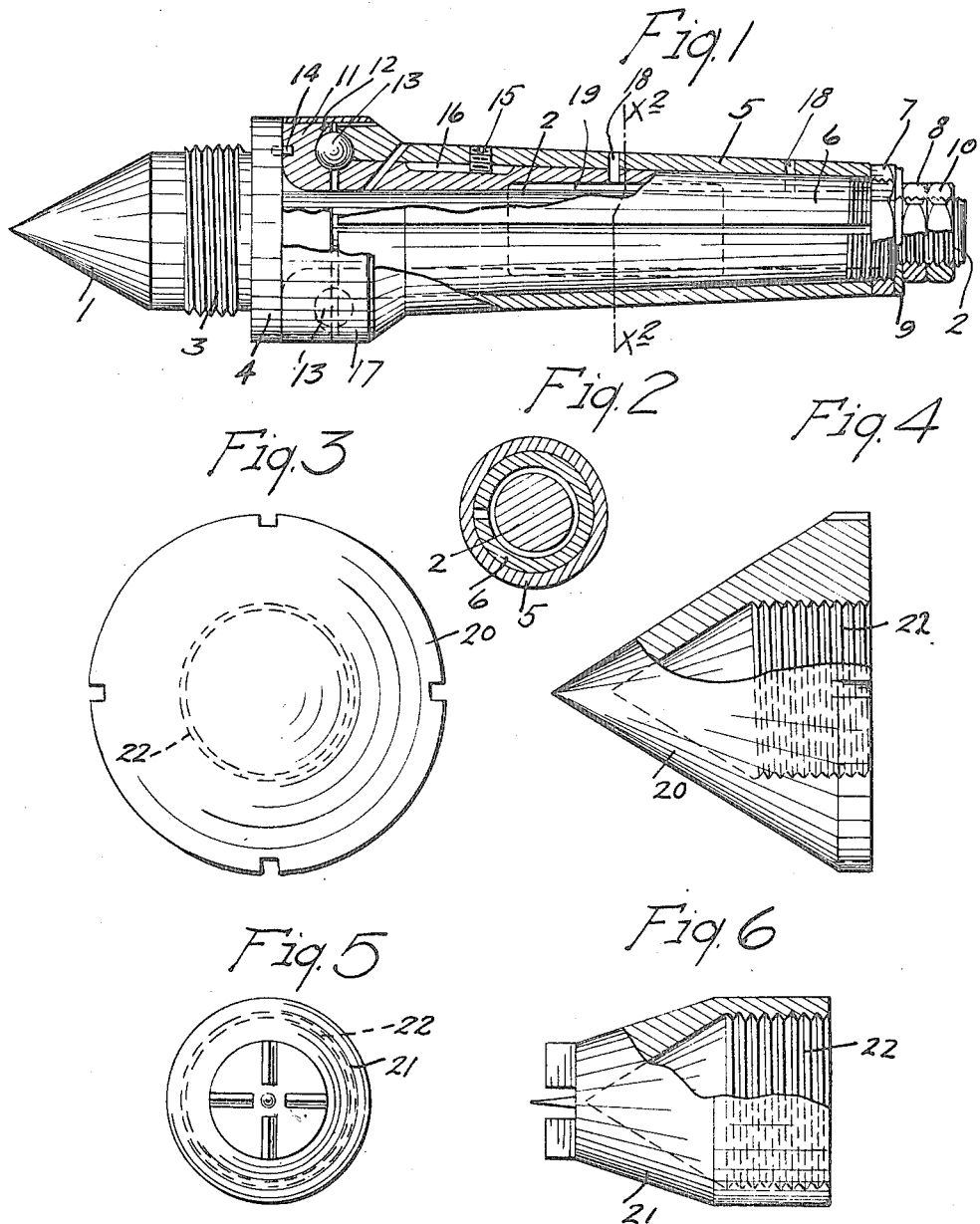

JOHN HELGERUD, OF MINNEAPOLIS, MINNESOTA.

LATHE-CENTER.

1,198,030.　　　　Specification of Letters Patent.　Patented Sept. 12, 1916.

Application filed April 8, 1916. Serial No. 89,784.

*To all whom it may concern:*

Be it known that I, JOHN HELGERUD, a citizen of the United States, residing at Minneapolis, in the county of Hennepin and State of Minnesota, have invented certain new and useful Improvements in Lathe-Centers; and I do hereby declare the following to be a full, clear, and exact description of the invention, such as will enable others skilled in the art to which it appertains to make and use the same.

My invention relates to improvements in lathe centers; and, to this end, it consists of the novel devices and combinations of devices hereinafter described and defined in the claims.

In the accompanying drawings, which illustrate the invention, like characters indicate like parts throughout the several views.

Figure 1 is a view principally in side elevation of the improved lathe center with some parts shown in longitudinal central section and with some parts broken away; Fig. 2 is a transverse section taken on the line $X^2$ $X^2$ of Fig. 1; Fig. 3 is an end elevation of a supplemental lathe center point especially adapted for pipe work; Fig. 4 is a view partly in side elevation and partly in longitudinal central section illustrating the point shown in Fig. 3. Fig. 5 is an end elevation of a lathe center point especially adapted for use in wood work; and Fig. 6 is a view partly in side elevation and partly in longitudinal central section of the lathe center point illustrated in Fig. 5.

The numerals 1 and 2 indicate, respectively, the integrally formed conical point and shank of the improved lathe center. The body of the lathe center between its point 1 and shank 2 is of true cylindrical form and has screw threads 3 cut therein at its intermediate portion. A thrust collar 4 is integrally formed with the body of the lathe center at the junction of the shank 2 therewith.

An external sleeve 5 frictionally fits into the spindle of the tail-stock of the lathe (not shown) in the customary manner. Within the sleeve 5 is a longitudinally split bushing 6, externally tapered to fit the internal taper of said sleeve and in which bushing the shank 2 is journaled. A nut 7 has screw threaded engagement with the rear end of the bushing 6 which projects through the rear end of the sleeve 5 and impinges against the sleeve as the base of resistance. The rear end of the spindle 2 extends beyond the rear end of the bushing 6 and a nut 8 has screw threaded engagement therewith, and impinges against the nut 7 as a base of resistance. Interposed between the nuts 7 and 8 is a washer 9 and a lock nut 10 for the nut 8 also has screw threaded engagement with the spindle 2. Obviously by turning the nut 7 in the proper direction the bushing 6 may be moved axially rearward in the sleeve 5 and the tapered fit between the sleeve 5 and bushing 6 will cause the said bushing to circumferentially contract onto the spindle 2 to take up wear.

Telescoped onto the shank 2 and against the collar 4 is an annular block 11 having in its rear face an annular recess which forms one-half of a ball-race 12, in an anti-friction thrust bearing. The front end of the sleeve 5 is expanded to substantially the same diameter as the block 11 and has formed therein an annular recess which forms the other half of the ball-race 12. Balls 13 are mounted in the ball-race 12. A dowel pin 14 locks the block 11 to the collar 4 for common rotation therewith, but permits axial separation therefrom. Having screw threaded engagement with the sleeve 5 is a lock pin 15 which projects into a longitudinally extended groove 16 cut in the bushing 6 and locks the bushing to the sleeve 5 against rotation but permits the radial adjustment thereof. By turning the nut 8 on the spindle 2, said spindle may be moved axially in the bushing to properly adjust the members of the thrust bearing.

To exclude dust and dirt from the thrust bearing a collar 17 overlaps the joint between the sleeve 5 and block 11 and has a driving fit with the block 11 and a running fit with the expanded portion of the sleeve 5. The spindle 2 is oiled through oil holes 18 formed in the sleeve 5 and bushing 6 and the central internal portion of the bushing 6 is recessed to form a pocket 19 for holding oil in which the spindle 2 runs.

The numerals 20 and 21 indicate respectively supplemental lathe center points for holding pipe work and wood work, respectively. Each of these points is recessed and provided with internal screw threads 22 adapting the same to be placed over the conical point 1 and detachably secured to the lathe center by means of the screw threads 3—21. When either one of the points 19—20 is secured to the lathe center the same engages the thrust collar 4 as a base of resistance.

By the use of the improved lathe center friction between the work and point of the center is entirely done away with and wear between the several parts of the lathe center may be easily taken up by means of the several adjustments provided.

What I claim is:

1. A lathe center having a collar between its point and shank, a tapered sleeve having a longitudinally split tapered bushing in which the shank is journaled, means for axially adjusting the shank in the bushing, means for axially adjusting the bushing in the sleeve, and an anti-friction thrust bearing interposed between the collar and sleeve.

2. A lathe center having a collar between its point and shank, a tapered sleeve having a longitudinally split tapered bushing in which the shank is journaled, means for axially adjusting the shank in the bushing, means for axially adjusting the bushing in the sleeve, means for holding the bushing against rotation in the sleeve, but permitting axial adjustment thereof, and an anti-friction thrust bearing interposed between the collar and sleeve.

3. A lathe center having a collar between its point and shank, a tapered sleeve having a longitudinally split bushing in which the shank is journaled, a nut having screw thread engagement with the bushing and impinging against the sleeve as a base of resistance in the axial adjustment of the shank therein, a nut having screw threaded engagement with the shank and impinging against the nut on the bushing as a base of resistance in the axial adjustment of the spindle in the bushing, and an anti-friction thrust bearing interposed between the collar and sleeve.

In testimony whereof I affix my signature in presence of a witness.

JOHN HELGERUD.

Witness:
HARRY D. KILGORE.